United States Patent
Iida et al.

(10) Patent No.: US 12,191,526 B2
(45) Date of Patent: Jan. 7, 2025

(54) BATTERY AND MANUFACTURING METHOD THEREOF

(71) Applicant: FDK CORPORATION, Tokyo (JP)

(72) Inventors: Yuya Iida, Tokyo (JP); Yuki Yamane, Tokyo (JP); Masao Kondo, Tokyo (JP)

(73) Assignee: FDK CORPORATION, Tokyo (JP)

( * ) Notice: Subject to any disclaimer, the term of this patent is extended or adjusted under 35 U.S.C. 154(b) by 184 days.

(21) Appl. No.: 17/549,991

(22) Filed: Dec. 14, 2021

(65) Prior Publication Data

US 2022/0271401 A1    Aug. 25, 2022

(30) Foreign Application Priority Data

Feb. 25, 2021   (JP) ................. 2021-028085

(51) Int. Cl.
*H01M 50/516* (2021.01)
*H01M 50/503* (2021.01)
*H01M 50/533* (2021.01)
*H01M 50/574* (2021.01)

(52) U.S. Cl.
CPC ....... *H01M 50/516* (2021.01); *H01M 50/503* (2021.01); *H01M 50/533* (2021.01); *H01M 50/574* (2021.01)

(58) Field of Classification Search
CPC . H01M 50/516; H01M 50/503; H01M 50/574
See application file for complete search history.

(56) References Cited

U.S. PATENT DOCUMENTS

| 2015/0111442 | A1  | 4/2015 | Miyamoto et al. |
| 2016/0064717 | A1* | 3/2016 | Nishimura .......... H01M 50/505 429/158 |
| 2016/0197330 | A1  | 7/2016 | Takase et al. |
| 2017/0141487 | A1* | 5/2017 | Tamura ................. H01R 4/184 |
| 2018/0226628 | A1  | 8/2018 | Takasu et al. |

FOREIGN PATENT DOCUMENTS

| JP | 2005-251709 A | 9/2005 |
| JP | 2018-22878 A  | 2/2018 |
| JP | 2018-78041 A  | 5/2018 |

OTHER PUBLICATIONS

Extended European search report with the European search opinion issued by the European Patent Office for corresponding European Patent Application No. 22151324.5-1108, dated Jul. 6, 2022.
Communication pursuant to Article 94(3) EPC issued by the European Patent Office for corresponding European Patent Application No. 22 151 324.5, dated Aug. 13, 2024.

* cited by examiner

*Primary Examiner* — Jimmy Vo
(74) *Attorney, Agent, or Firm* — Myers Wolin, LLC

(57) ABSTRACT

An axial lead extending on a principal surface of a flat tab includes a main body part having a diameter and a connection part. The connection part includes a first part located adjacent to the main body part and a second part located from the first part and the end part. The first part includes a weld part welded to the flat tab and has a first thickness less than the diameter. The second part includes a non-weld part not welded to the flat tab and has a second thickness equal to or less than the first thickness. The second part is formed by pressing the end part of the axial lead, the end part having been raised when resistance welding is performed on the axial lead and the flat tab.

4 Claims, 10 Drawing Sheets

BATTERY AND MANUFACTURING METHOD THEREOF

CROSS-REFERENCE TO RELATED APPLICATION

This application is based upon and claims the benefit of priority of the prior Japanese Patent Application No. 2021-028085, filed on Feb. 25, 2021, the entire contents of which are incorporated herein by reference.

FIELD

The embodiment discussed herein relates to a cell and a manufacturing method thereof.

BACKGROUND

When a tab used as a terminal such as a cell element material is cut off, a burr is formed. There is known a technique of preventing such a burr from damaging a cell element material and becoming a cause of a short circuit or a failure by pressing and flattening the burr on a press table.

There are also known a technique of pressing a side end part of an electrode plate of an alkaline secondary cell and a technique of preventing generation of a burr at a corner part by providing a side end part of an electrode plate for which filler is used with a non-injection part and by performing pressing.

There are also known a technique of obtaining a tab terminal by pressing an end part of a metal rod into a flat plate and a technique of connecting a lead wire to the other end part of the metal rod.

Japanese Laid-open Patent Publication No. 2005-251709
Japanese Laid-open Patent Publication No. 2018-78041
Japanese Laid-open Patent Publication No. 2018-22878

There are cases where a metal plate such as a tab is electrically connected to at least one of the positive electrode and the negative electrode of a cell. There are cases where a lead, such as an axial-type electrical element, is connected to the metal plate by resistance welding. For such resistance welding between a lead and a metal plate, for example, to achieve a stable welded area and current density between the lead and the metal plate, there is adopted a technique of performing resistance welding between a midway part of the lead, not an end part of the lead, and the metal plate.

With this technique, a dent is caused in the midway part of the lead on which the resistance welding is performed, and the end part of the lead could be raised from the metal plate due to the stress caused by the resistance welding. The raised end part of the lead has a relatively sharp shape. Thus, if a relatively flexible different component, e.g., a different component such as a lead wire whose core wire is covered by covering material, is located on the raised part of the lead of a cell on which the metal plate connected to the lead by the resistance welding has been mounted, the different component could be damaged or an electrical failure could be caused by this damaged component.

SUMMARY

According to one aspect, there is provided a cell including: a metal plate; and a lead that extends on a first principal surface of the metal plate, wherein the lead includes a main body part having a first diameter and a connection part that is located from the main body part to an end part of the lead and that is connected to the first principal surface, wherein the connection part includes a first part which is located adjacent to the main body part, which includes a weld part welded to the first principal surface, and which has a first thickness less than the first diameter in a first direction perpendicular to the first principal surface, and wherein the connection part includes a second part, which is located from the first part to the end part, which includes a non-weld part not welded to the first principal surface, and which has a second thickness equal to or less than the first thickness in the first direction.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

DESCRIPTION OF EMBODIMENT(S)

Figure 1:
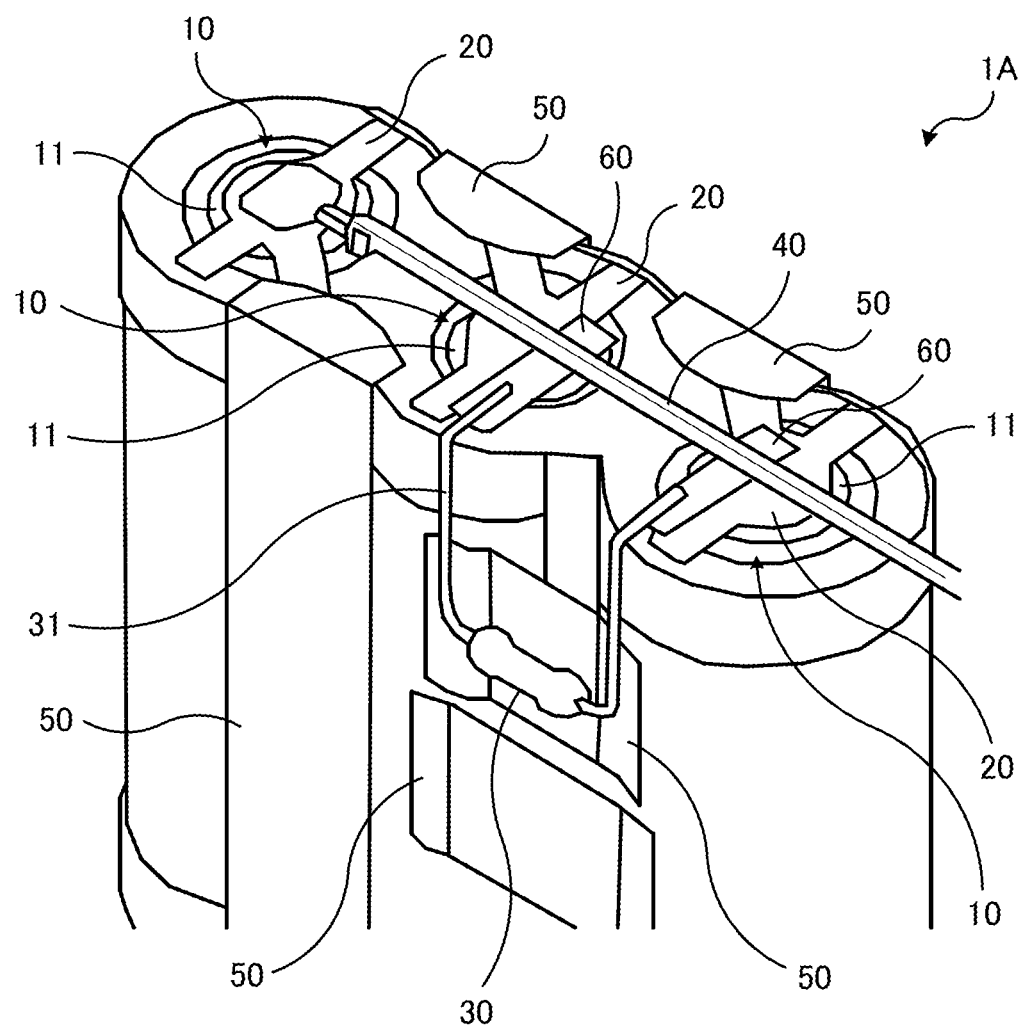
FIG. 1 illustrates an example of a battery.

FIG. 1 illustrates an example of a battery. FIG. 1 is a schematic perspective view of a main part of an example of a battery.

In FIG. 1, a battery 1A is illustrated as an example of a battery. The battery 1A illustrated in FIG. 1 includes three cells 10. These cells 10 are electrically connected in series or parallel. An electrode tab 20 is connected to the positive electrode or the negative electrode 11 (also referred to as an "electrode") of the individual cell 10. Certain electrode tabs 20 are connected to each other via a lead wire or the like (not illustrated), and these cells 10 are electrically connected to each other.

As protection components for better safety, an electrical element such as a diode, a current fuse, or a positive temperature coefficient (PTC) element may be connected between certain electrodes 11 of the battery 1A. For example, as illustrated in FIG. 1, an electrical element 30 having an axial-type lead (also referred to as an "axial lead") 31 is connected between certain electrodes 11.

A lead wire 40 used for connection between the battery 1A and an external load is connected to electrodes 11 of certain cells 10 of the battery 1A.

In addition, the battery 1A is provided with covering members 50 such as insulating tapes, to prevent a short circuit between certain cells 10 (electrodes 11 thereof or electrode tabs 20 connected to the electrodes 11) or between a certain cell 10 and the electrical element 30.

Hereinafter, the connection of the electrical element 30 of the battery 1A will be described in more detail.

For example, the axial lead 31 of the electrical element 30 is connected to flat metal plates 60 (also referred to as "flat tabs"). By connecting the flat tabs 60, to which the axial lead 31 of the electrical element 30 is connected, to electrodes 11 of certain cells 10 or to the electrode tabs 20 connected to the electrodes, the flat tabs 60 are mounted on the battery 1A.

For this connection between the axial lead 31 of the electrical element 30 and the flat tabs 60, solder welding is used. Depending on the purpose, use of solder is not applicable. In this case, resistance welding is used.

Figure 2A:
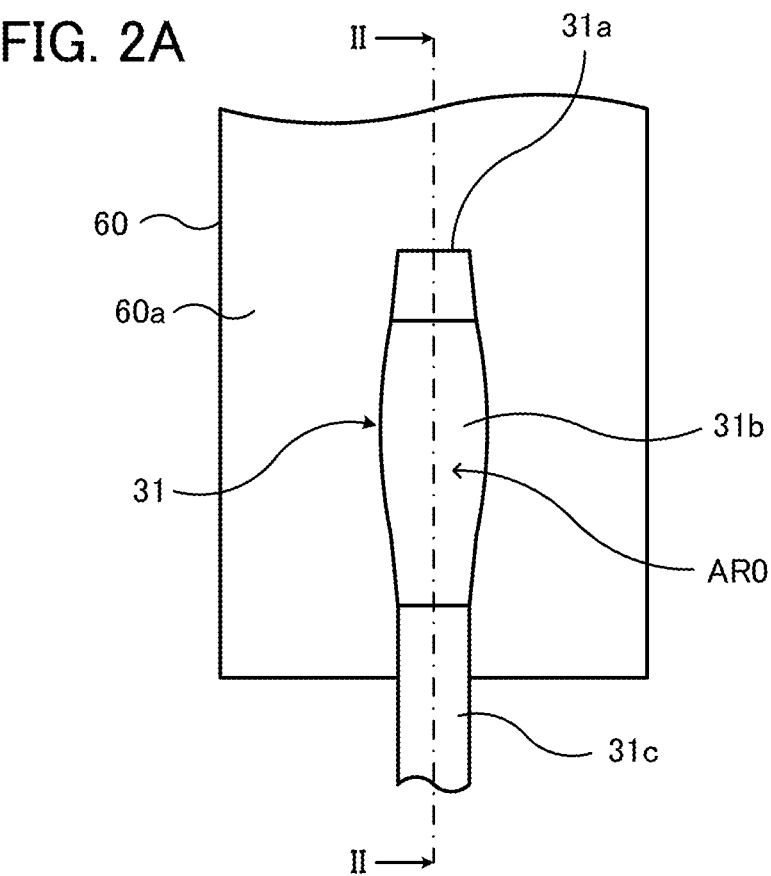
FIGS. 2A and 2B illustrate an example of resistance welding between an axial lead and a flat tab.
Figure 2B:
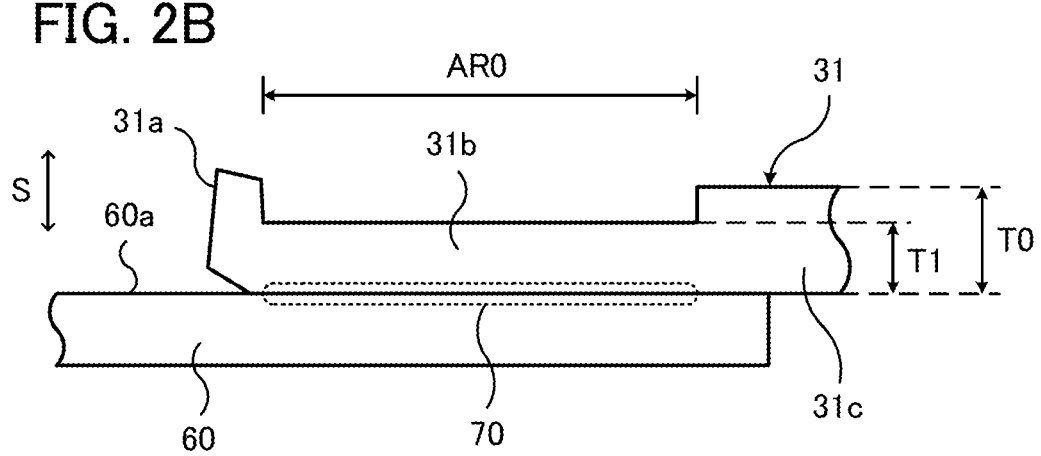

FIGS. 2A and 2B illustrate an example of resistance welding between an axial lead and a flat tab. FIG. 2A is a schematic plan view of a main part of an example of an axial lead and a flat tab on which resistance welding has been performed. FIG. 2B is a schematic sectional view taken along a line II-II in FIG. 2A.

When resistance welding is performed between the axial lead 31 of the electrical element 30 and a flat tab 60, an areas including an end part 31a of the axial lead 31 could be set as the weld area. However, in this case, if the weld location varies, the welded area also varies, and the current density between the axial lead 31 and the flat tab 60 could consequently vary. Thus, when resistance welding is performed between the axial lead 31 and the flat tab 60, a midway part 31b of the axial lead 31, not the end part 31a, is set as a weld area AR0. By setting the midway part 31b of the axial lead 31 as the weld area AR0, even if the weld location varies, the welded area and the current density do not greatly vary.

If the resistance welding is performed by setting the midway part 31b of the axial lead 31 as the weld area AR0, a dent is caused in the midway part 31b in the direction of a principal surface 60a of the flat tab 60, as illustrated in FIGS. 2A and 2B. For example, as illustrated in FIG. 2B, by performing the resistance welding between the axial lead 31 having a diameter T0 and the principal surface 60a of the flat tab 60, the axial lead 31 is dented at the midway part 31b in the weld area AR0, that is, at a weld part 70. Dented by the resistance welding, the axial lead 31 in the weld area AR0 has a thickness T1, which is less than the diameter T0 of the main body part 31c on which the resistance welding has not been performed. The thickness T1 is the thickness of the axial lead 31 in the weld area AR0 in a direction S perpendicular to the principal surface 60a of the flat tab 60.

As described above, if the resistance welding is performed by setting the midway part 31b of the axial lead 31 as the weld area AR0, a dent is caused in the midway part 31b. On the other hand, due to the stress caused by the resistance welding, the end part 31a of the axial lead 31 could be raised from the principal surface 60a of the flat tab 60, as illustrated in FIG. 2B. The raised end part 31a of the axial lead 31 has a relatively sharp shape. Thus, in the case of the battery 1A on which the flat tabs 60 to which the axial lead 31 is attached by the resistance welding are mounted, if a relatively flexible different component is located on the raised end part 31a of the axial lead 31, the different component could be damaged or an electrical failure could be caused by this damaged component.

For example, in the case of the battery 1A, if the lead wire 40 (FIG. 1) whose core wire is covered by covering material is located on the raised end part 31a of the axial lead 31, the covering material of the lead wire 40 could be damaged by the end part 31a of the axial lead 31. If the core wire comes into contact with the axial lead 31 or a flat tab 60 connected to the axial lead 31, a short circuit occurs.

To prevent the covering material of the lead wire 40 of the battery 1A from being damaged, the lead wire 40 may be disposed to avoid the raised end part 31a of the axial lead 31. However, in this way, a process for managing the location of the lead wire 40 needs to be added, which could result in an increase in cost. Even if the location of the lead wire 40 is managed and the lead wire 40 is disposed to avoid the raised end part 31a of the axial lead 31, the vibration caused during transportation or use of the battery 1A could move the lead wire 40. As a result, the covering material of the lead wire 40 could be damaged, thereby causing a short circuit between the core wire of the lead wire 40 and the axial lead 31. In addition, while one conceivable solution is attaching a protection component such as an insulating plate above the raised end part 31a of the axial lead 31, addition of such a protection component could increase the man-hours and the cost.

In view of the above points, herein, a technique as described as the following embodiment is adopted. With this technique, after the end part 31a of the axial lead 31 is raised by the resistance welding between the end part 31a and the principal surface 60a of a flat tab 60, the raised end part 31a is flattened. Thus, the end part 31a of the axial lead 31 does not damage a different component such as the lead wire 40.

Figure 3A:
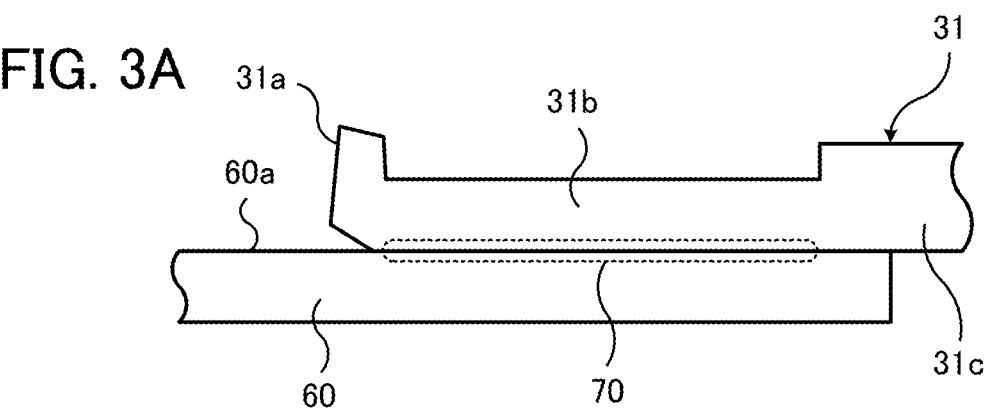
FIGS. 3A and 3B illustrate an example of a method for forming a connected body of an axial lead and a flat tab according to an embodiment.
Figure 3B:
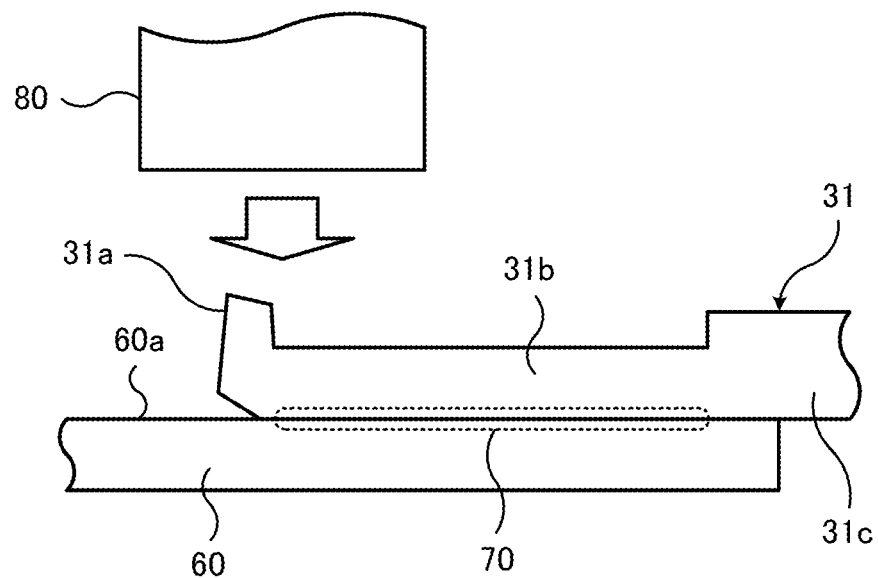

FIGS. 3A and 3B illustrate an example of a method for forming a connected body of an axial lead and a flat tab according to an embodiment. FIG. 3A is a schematic sectional view of a main part of an example of a process of performing resistance welding between an axial lead and a flat tab. FIG. 3B is a schematic sectional view of a main part of an example of a process of pressing the axial lead.

To form a connected body of an axial lead 31 and a flat tab 60, first, as illustrated in FIG. 3A, resistance welding is performed between a midway part 31b of the axial lead 31 and a principal surface 60a of the flat tab 60. As a result, the axial lead 31 and the flat tab 60 are welded to each other at a weld part 70 and are integrated.

In the resistance welding between the midway part 31b of the axial lead 31 and the principal surface 60a of the flat tab 60, due to the resultant stress, as illustrated in FIG. 3A, an end part 31a of the axial lead 31 is raised from the principal surface 60a of the flat tab 60. An area including this raised end part 31a is pressed by using a press die 80, as illustrated in FIG. 3B. Through this pressing using the press die 80, the end part 31a, which has been raised at the time of the resistance welding, is pressed and flattened in the direction of the principal surface 60a of the flat tab 60 (FIGS. 4A to 6B, for example).

Figure 4A:
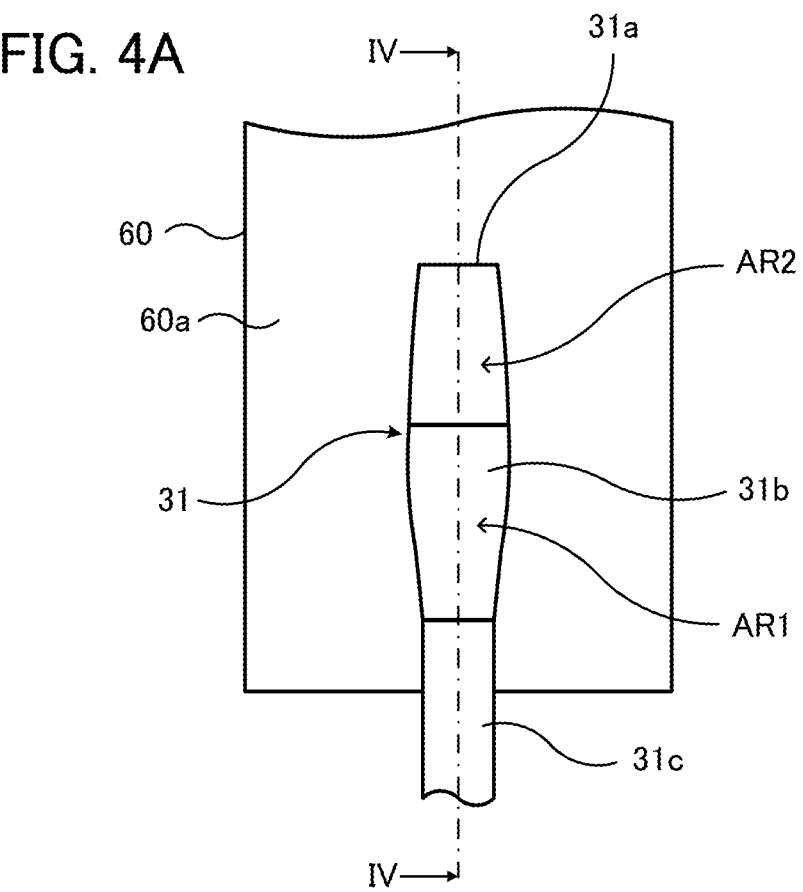
FIGS. 4A and 4B illustrate an example of the connected body of the axial lead and the flat tab according to the embodiment.
Figure 4B:
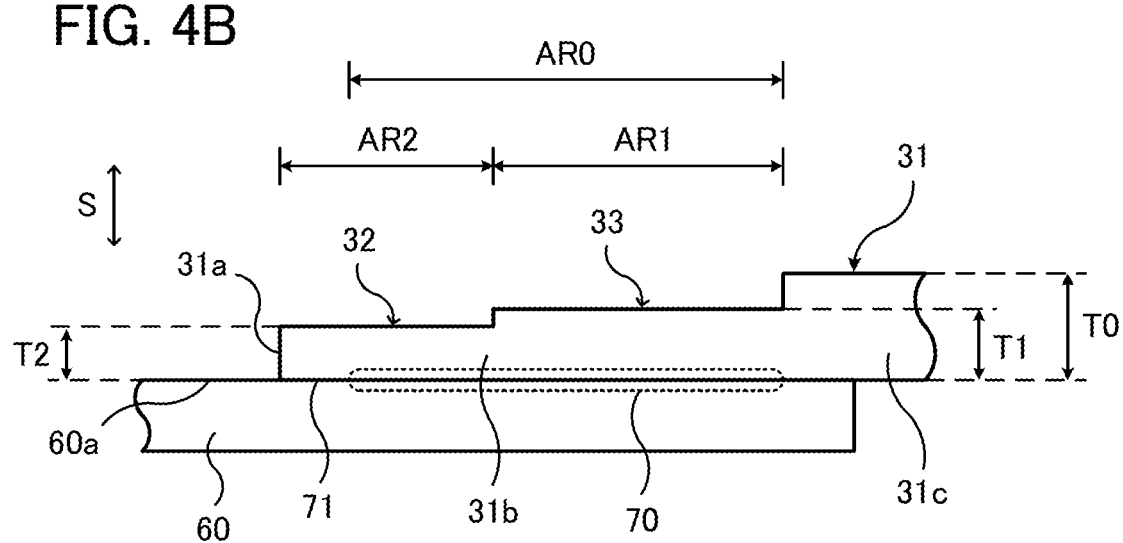

FIGS. 4A and 4B illustrate an example of the connected body of the axial lead and the flat tab according to the embodiment. FIG. 4A is a schematic plan view of a main part of an example of the connected body of the axial lead and the flat tab. FIG. 4B is a schematic sectional view taken along a line IV-IV in FIG. 4A.

As described above, first, the resistance welding is performed between the midway part 31b of the axial lead 31 and the principal surface 60a of the flat tab 60 (FIG. 3A), and next, the end part 31a, which has been raised by the resistance welding, is pressed by the press die 80 (FIG. 3B).

As a result, for example, the connected body of the axial lead 31 and the flat tab 60 is obtained as illustrated in FIGS. 4A and 4B.

FIGS. 4A and 4B illustrate an example of a connected body obtained by pressing an area (also referred to as a "press area") AR2, which is from the end part 31*a* of the axial lead 31 to a part of a weld area AR0 in which the resistance welding is performed (the weld part 70 formed by the resistance welding), by using the press die 80 (FIG. 3B).

By performing the resistance welding between the axial lead 31 having a diameter T0 and the principal surface 60*a* of the flat tab 60, the weld area AR0 (the midway part 31*b* and the weld part 70) of the axial lead 31 is dented. The part of the axial lead 31 in the weld area AR0 has a thickness T1, which is less than the diameter T0 of a main body part 31*c* on which the resistance welding has not been performed. In addition, since the end part 31*a*, which has been raised by the resistance welding, is pressed, the axial lead 31 is dented in the press area AR2. Thus, a part 32 of the axial lead 31 in the press area AR2 has a thickness T2, which is less than the thickness T1 of a part 33 in a weld area (also referred to as a "non-press weld area") AR1, which has not been pressed, in the weld area AR0, for example. As a result, the end part 31*a*, which has been raised by the resistance welding, is flattened.

The thickness T1 is the thickness of the part 33 of the axial lead 31 in the weld area AR0 and the non-press weld area AR1 in a direction S perpendicular to the principal surface 60*a* of the flat tab 60. The thickness T2 is the thickness of the part 32 of the axial lead 31 in the press area AR2 in the direction S perpendicular to the principal surface 60*a* of the flat tab 60.

The raised end part 31*a* of the axial lead 31 is flattened by the pressing as described above. Thus, in the case of a battery including the connected body of the axial lead 31 and the flat tab 60, even if a relatively flexible different component, such as the lead wire 40 (FIG. 1), is located over the end part 31*a* of the axial lead 31, it is possible to effectively prevent the different component from being damaged.

In the case of the connected body of the axial lead 31 and the flat tab 60 as illustrated in FIGS. 4A and 4B, the part 33 of the axial lead 31 in the non-press weld area AR1 adjacent to the main body part 31*c* of the axial lead 31 includes the weld part 70. The part 32 of the axial lead 31 in the press area AR2, the part 32 extending from the part 33 to the end part 31*a*, includes a part of the weld part 70 connected to the principal surface 60*a* of the flat tab 60 by the resistance welding and a non-weld part 71 including the end part 31*a* on which the resistance welding has not been performed. The non-weld part 71 is pressed against the principal surface 60*a* of the flat tab 60 by the pressing of the axial lead 31 and is brought into contact with and connected to the principal surface 60*a*. The axial lead 31 in the non-press weld area AR1 and the press area AR2, that is, the parts 33 and 32, which extend from the main body part 31*c* of the axial lead 31 to the end part 31*a*, may be referred to as a "connection part" of the axial lead 31, the connection part being connected to the principal surface 60*a* of the flat tab 60.

In the above example of FIGS. 4A and 4B, an area from the end part 31*a* of the axial lead 31 to a part in the weld area AR0 on which the resistance welding is performed (the weld part 70 formed by the resistance welding) is set as the press area AR2, and the part 32 of the axial lead 31 in the press area AR2 is pressed to have a thickness T2, which is less than the thickness T1 of the part 33 in the non-press weld area AR1. The method for pressing the axial lead 31 after the resistance welding is not limited to the above example as illustrated in FIGS. 4A and 4B.

Figure 5A:
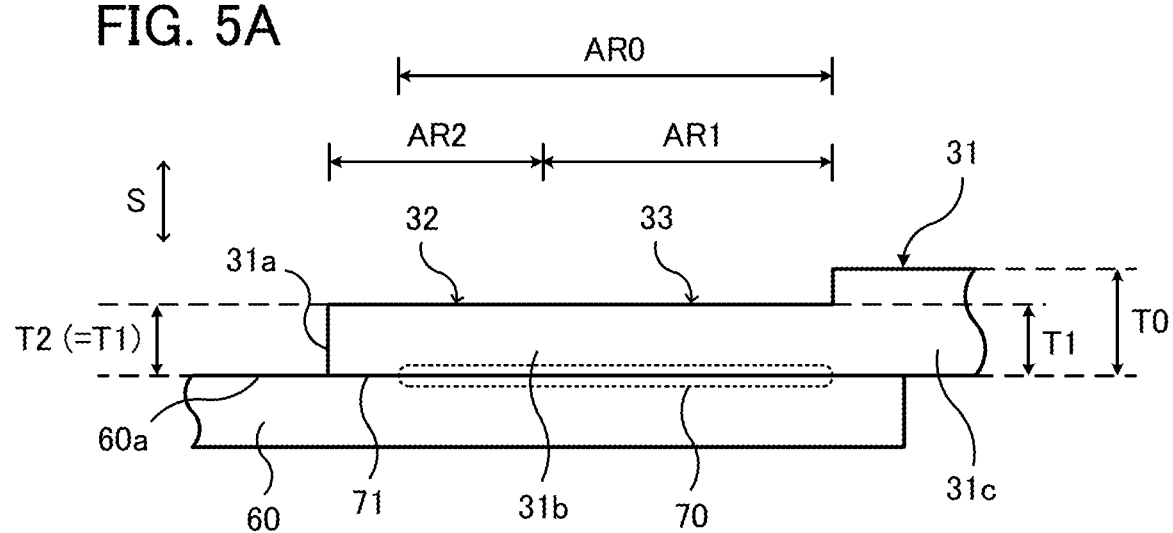
FIGS. 5A and 5B illustrate first and second variations of the connected body of the axial lead and the flat tab according to the embodiment.
Figure 5B:
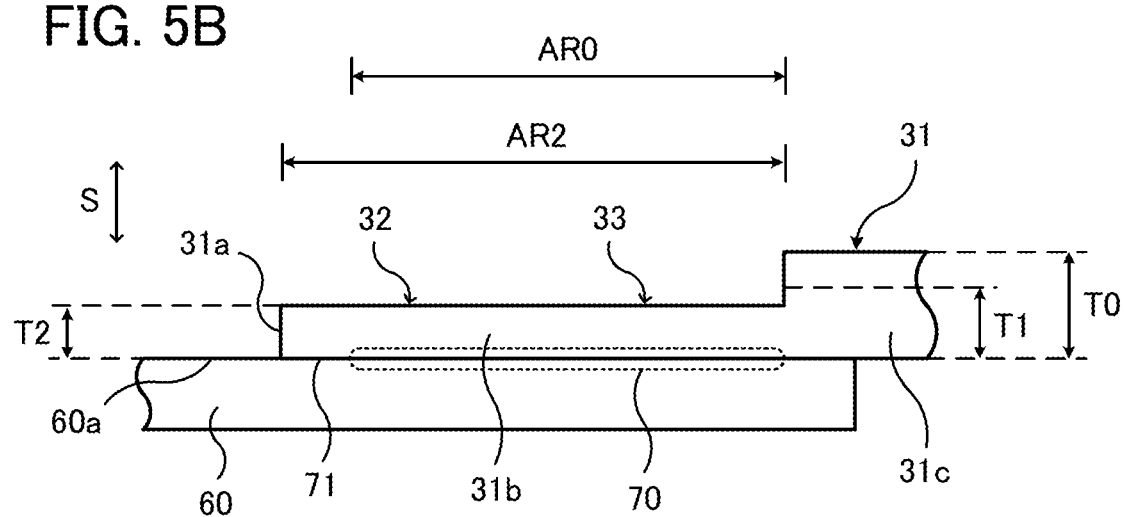
Figure 6A:
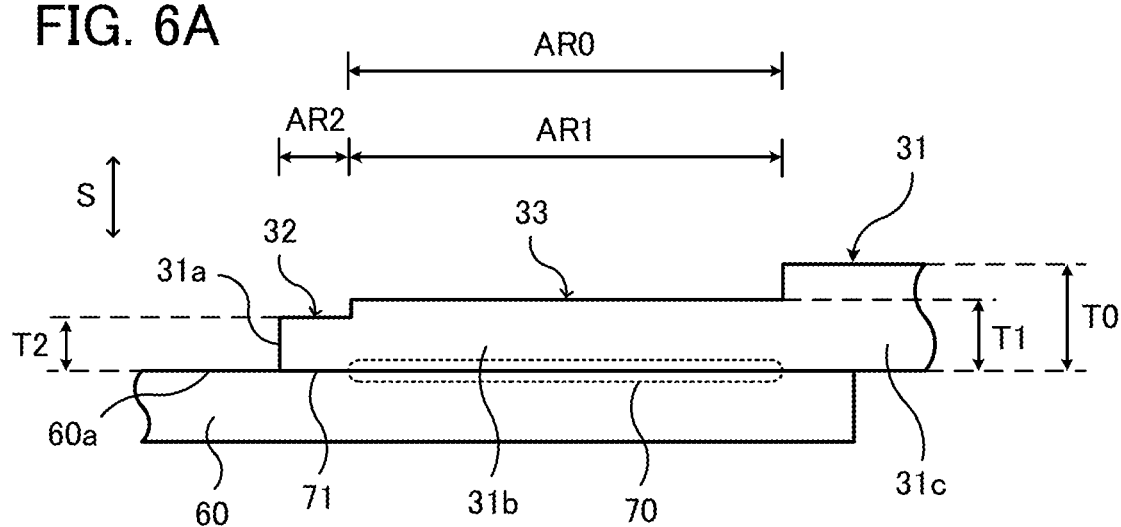
FIGS. 6A and 6B illustrate third and fourth variations of the connected body of the axial lead and the flat tab according to the embodiment.
Figure 6B:
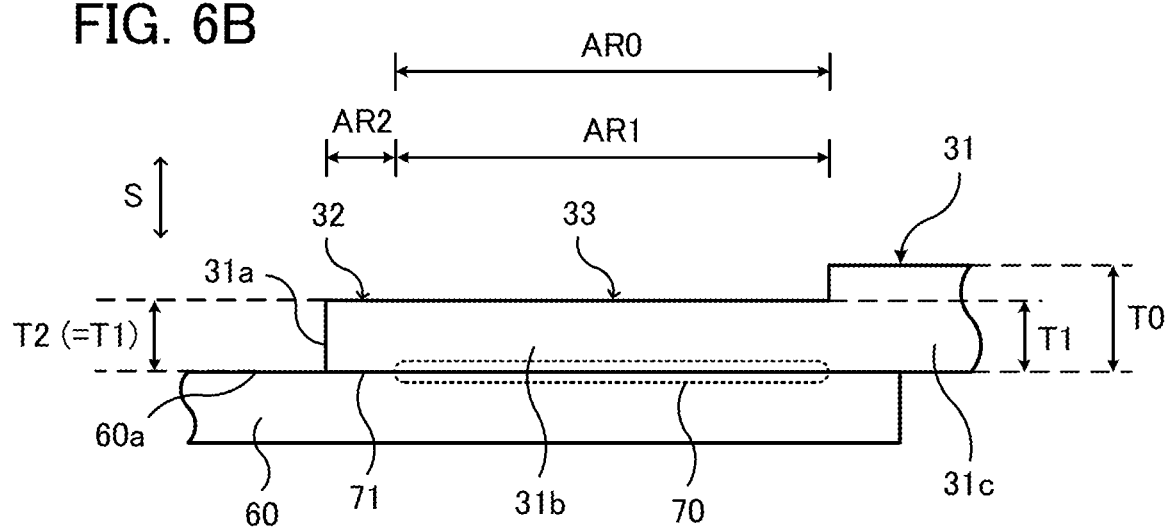

FIGS. 5A and 5B and FIGS. 6A and 6B illustrate variations of the connected body of the axial lead and the flat tab according to the embodiment. FIG. 5A is a schematic sectional view of a main part of a first variation of the connected body of the axial lead and the flat tab. FIG. 5B is a schematic sectional view of a main part of a second variation of the connected body of the axial lead and the flat tab. FIG. 6A is a schematic sectional view of a main part of a third variation of the connected body of the axial lead and the flat tab. FIG. 6B is a schematic sectional view of a main part of a fourth variation of the connected body of the axial lead and the flat tab.

For example, as illustrated in FIG. 5A, when the axial lead 31 is pressed after the resistance welding, an area from the end part 31*a* of the axial lead 31 to a part in the weld area AR0 (the weld part 70) may be set as the press area AR2, and the part 32 in the press area AR2 may be pressed to have the same thickness as that of the part 33 in the non-press weld area AR1. That is, the pressing may be performed such that the thickness T2 of the part 32 in the press area AR2 becomes the same as the thickness T1 of the part 33 in the non-press weld area AR1.

Alternatively, for example, as illustrated in FIG. 5B, when the axial lead 31 is pressed after the resistance welding, an area including the end part 31*a* of the axial lead 31 and the entire weld area AR0 (the weld part 70) may be set as the press area AR2, and the part 32 in the press area AR2 may be pressed to have the thickness T2, which is less than the thickness T1 of the part in the weld area AR0 before the pressing of the axial lead 31.

For example, the raised end part 31*a* of the axial lead 31 may be flattened by the pressing as illustrated in FIGS. 5A and 5B.

Alternatively, for example, as illustrated in FIG. 6A, when the axial lead 31 is pressed after the resistance welding, the area from the end part 31*a* of the axial lead 31 to a part immediately before the weld area AR0 (the weld part 70), that is, only the non-weld part 71 between the weld part 70 and the non-weld part 71 may be set as the press area AR2, and the part 32 in the press area AR2 may be pressed to have the thickness T2, which is less than the thickness T1 of the part 33 in the non-press weld area AR1.

Alternatively, for example, as illustrated in FIG. 6B, when the axial lead 31 is pressed after the resistance welding, an area from the end part 31*a* of the axial lead 31 to a part immediately before the weld area AR0 (the weld part 70), that is, only the non-weld part 71 between the weld part 70 and the non-weld part 71 may be set as the press area AR2, and the part 32 in the press area AR2 may be pressed to have the same thickness as that of the part 33 in the non-press weld area AR1. That is, the part 32 in the press area AR2 may be pressed such that the thickness T2 of the part 32 becomes the same as the thickness T1 of the part 33 in the non-press weld area AR1.

For example, the raised end part 31*a* of the axial lead 31 may be flattened by the pressing as illustrated in FIGS. 6A and 6B.

It is possible to flatten the raised end part 31*a* and prevent the end part 31*a* from damaging a different component by setting the thickness T2 of the part 32 of the axial lead 31 in the press area AR2 to be the same as or less than the thickness T1 of the part 33 in the non-press weld area AR1 or the thickness T1 of the part in the weld area AR0 before the pressing. However, if the thickness T2 of the part 32 in the press area AR2 is excessively reduced, the weld part 70 could have insufficient weld strength. To achieve certain weld strength, it is desirable that the thickness T2 of the part 32 of the axial lead 31 in the press area AR2 be set to 50% to 100% of the thickness T1 of the part 33 in the non-press weld area AR1 or the thickness T1 of the part in the weld area AR0 before the pressing.

Next, an example of a cell manufacturing method will be described. Herein, as an example, a method for manufacturing a battery will be described.

Figure 7A:
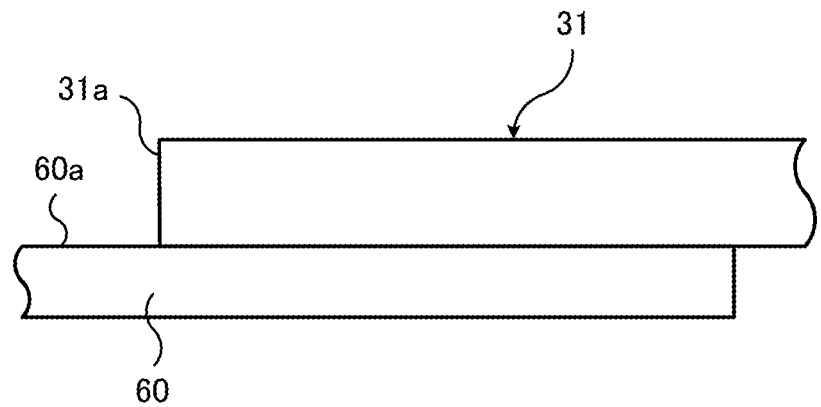
FIGS. 7A to 7C illustrate a first example of a battery manufacturing method according to the embodiment.
Figure 7B:
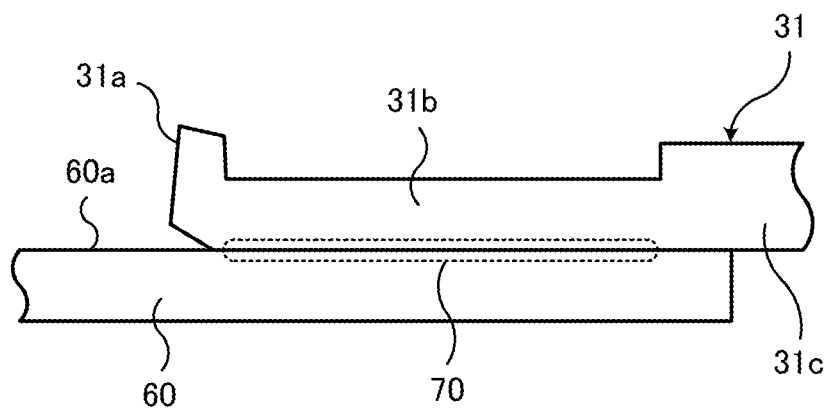
Figure 7C:
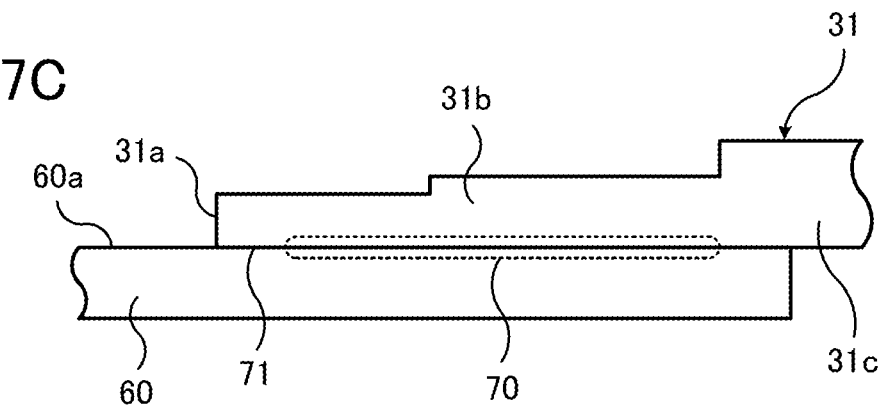
Figure 8A:
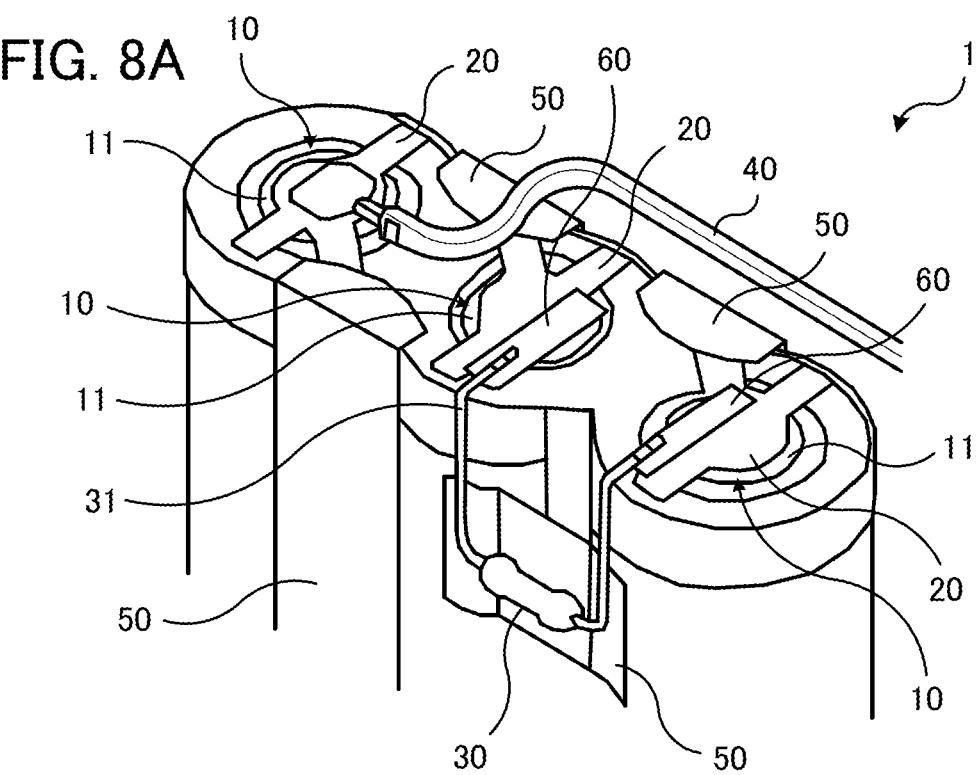
FIGS. 8A and 8B illustrate a second example of the battery manufacturing method according to the embodiment.
Figure 8B:
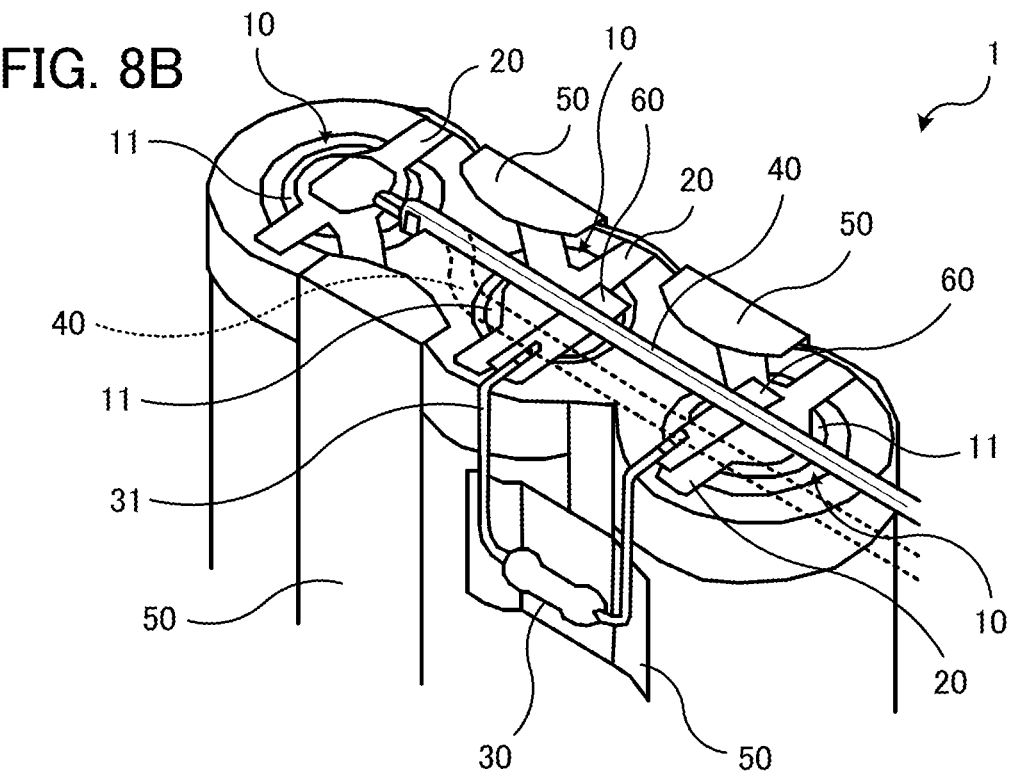

FIGS. 7A to 7C and FIGS. 8A and 8B illustrate an example of a battery manufacturing method according to the embodiment. FIG. 7A is a schematic sectional view of a main part of an example of a process for disposing an axial lead of an electrical element on a flat tab. FIG. 7B is a schematic sectional view of a main part of an example of a process for performing resistance welding between the axial lead of the electrical element and the flat tab. FIG. 7C is a schematic sectional view of a main part of an example of a process for pressing the axial lead of the electrical element. FIG. 8A is a schematic perspective view of a main part of an example of a process for mounting a connected body of an electrical element and flat tabs on a battery. FIG. 8B is a schematic perspective view of a main part of an example of the battery.

First, as illustrated in FIG. 7A, the axial lead 31 (the diameter T0) of the electrical element 30 (FIGS. 8A and 8B), which is to be mounted on the battery 1, is disposed on a predetermined location on the principal surface 60a of a flat tab 60. The axial lead 31 is extended and disposed on the predetermined location on the principal surface 60a so that the axis direction of the axial lead 31 will be parallel to the principal surface 60a of the flat tab 60.

Next, as illustrated in FIG. 7B, in accordance with the above example in the FIG. 3A, the resistance welding is performed between the midway part 31b of the axial lead 31 and the principal surface 60a of the flat tab 60. Consequently, the axial lead 31 and the flat tab 60 are welded at the weld part 70 and are integrated. As a result of this resistance welding, as illustrated in FIG. 7B, the midway part 31b of the axial lead 31 is dented (thickness T1 (<T0)), and the end part 31a is raised from the principal surface 60a of the flat tab 60.

Next, as illustrated in FIG. 7C, for example, in accordance with the above example in FIGS. 3B, 4A, and 4B, an area including the raised end part 31a of the axial lead 31, that is, an area including the non-weld part 71, is pressed. As a result, the end part 31a, which has been raised by the resistance welding, is dented in the direction of the principal surface 60a of the flat tab 60 and is flattened (thickness T2 (≤T1)). The area including the end part 31a raised by the resistance welding may be pressed in accordance with any one of the above examples in FIGS. 5A, 5B, 6A, and 6B.

For example, through the process as illustrated in FIGS. 7A to 7C, a connected body of the axial lead 31 having the flattened end part 31a and the flat tab 60 is obtained.

Next, as illustrated in FIG. 8A, the battery 1 is assembled. FIG. 8A illustrates, as an example, the battery 1 including three cells 10 electrically connected in series or parallel. An electrode tab 20 is connected to an electrode 11 (a positive electrode or a negative electrode) of the individual cell 10 of the battery 1, and certain electrode tabs 20 are connected to each other. The lead wire 40 used for connection between the battery 1 and an external load is connected to electrodes 11 of certain cells 10 of the battery 1. In the case of the battery 1, the electrical element 30 that serves as a protection component, such as a diode, a current fuse, a PTC element, and that has the axial lead 31 is connected between certain electrodes 11. In addition, the battery 1 is provided with covering members 50 such as insulating tapes, to prevent a short circuit between certain cells 10 or between a certain cell 10 and the electrical element 30.

The axial lead 31 of the electrical element 30 mounted on the battery 1 is previously connected to an individual flat tab 60 in accordance with the above method as described in FIGS. 7A to 7C, etc. and prepared as a connected body of the electrical element and the individual flat tab 60. Regarding the prepared connected body of the electrical element 30 and the individual flat tab 60, the individual flat tab 60 is connected to a corresponding electrode tab 20 connected to an electrode 11 of a certain cell 10, for example, as illustrated in FIG. 8A. In this way, the electrical element 30 is mounted on the battery 1.

FIG. 8B illustrates an example of the battery 1 on which the electrical element 30 is mounted. In the case of the battery 1, for example, as indicated by a dotted line in FIG. 8B, the lead wire 40 could shift and come into contact with the connected body of the electrical element 30 and the flat tab 60. In this case, if the end part 31a of the axial lead 31 of the electrical element connected to the flat tabs 60 remains raised after the resistance welding, the covering material of the lead wire 40 could be damaged. That is, the core wire of the lead wire 40 could come into contact with the axial lead 31 or any one of the flat tabs 60, and a short circuit could occur.

In contrast, in the case of the battery 1 illustrated in FIG. 8B, after the end part 31a of the axial lead 31 of the electrical element 30 is raised by the resistance welding, the raised end part 31a is dented by the pressing and is flattened. Thus, for example, as indicated by the dotted line in FIG. 8B, even if the lead wire 40 shifts and comes into contact with the connected body of the electrical element 30 and the individual flat tab 60, it is possible to effectively prevent the covering material of the lead wire 40 from being damaged, prevent the core wire of the lead wire 40 from coming into contact with the axial lead 31 or any one of the flat tabs 60, and prevent a short circuit from occurring due to the above contact.

Next, an example of an evaluation result about a connected body of the axial lead 31 of the electrical element 30 and the individual flat tab 60 and an example of an evaluation result about the battery 1 on which the connected body is mounted will be described.

(Evaluation of Connected Body)

Figure 9A:
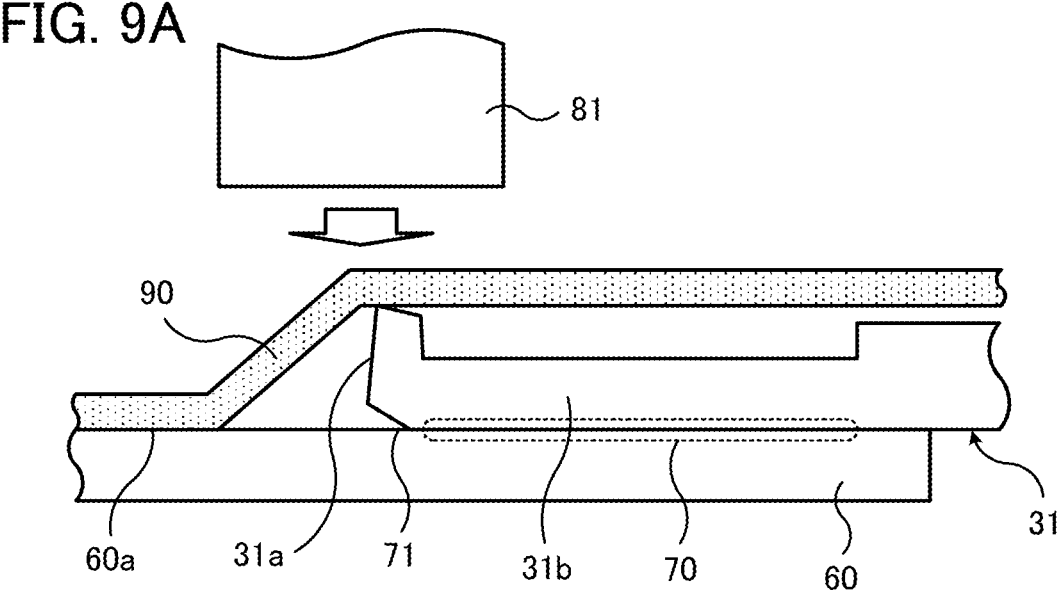
FIGS. 9A and 9B illustrate an example of evaluation of the connected body of the axial lead and the flat tab.
Figure 9B:
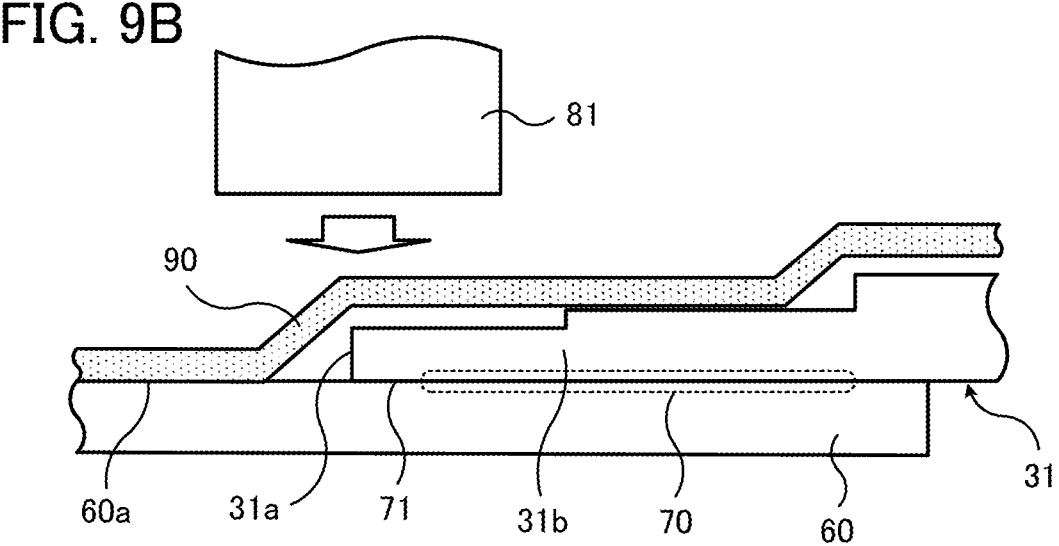

FIGS. 9A and 9B each illustrate an example of evaluation of a connected body of an axial lead and an individual flat tab according to the embodiment. FIG. 9A schematically illustrates a method for evaluating the impact of the connected body of the axial lead and the flat tab on a different component, the connected body being obtained after resistance welding and before pressing of an end part. FIG. 9B schematically illustrates a method for evaluating the impact of a connected body of an axial lead and an individual flat tab on a different component, the connected body being obtained after resistance welding and pressing of an end part.

As illustrated in FIGS. 9A and 9B, an insulating tape 90 was disposed on each connected body of the axial lead 31 and the flat tab 60. The individual axial lead 31 was pressed by using a press die 81 from the direction of the insulating tape 90, and the penetration strength of the end part 31a of the axial lead 31 with respect to the insulating tape 90 was measured. An acetate tape with a base material thickness of 0.18 mm was used as the insulating tape 90.

In the case of the connected body of the axial lead 31 and the flat tab 60 obtained after the resistance welding and before the pressing of the end part 31a as illustrated in FIG. 9A, since the end part 31a of the axial lead 31 was not pressed, the end part 31a remained raised. Thus, the end part 31a penetrated the insulating tape 90 when the insulating tape 90 was pressed by the press die 81 with a relatively low pressure of about 30 N.

In contrast, in the case of the connected body of the axial lead 31 and the flat tab 60 obtained after the resistance welding and the pressing of the end part 31a as illustrated in FIG. 9B, since the end part 31a of the axial lead 31 has been pressed and flattened, the end part 31a did not penetrate the insulating tape 90 until the insulating tape 90 was pressed by the press die 81 with a relatively high pressure of about 100 N.

From these evaluation results, by pressing and flattening the end part 31a of the axial lead 31 whose midway part 31b has been connected to the flat tab 60 by the resistance welding, it is possible to effectively prevent damage to a different component disposed over the end part 31a.

(Evaluation of Battery)

Figure 10:
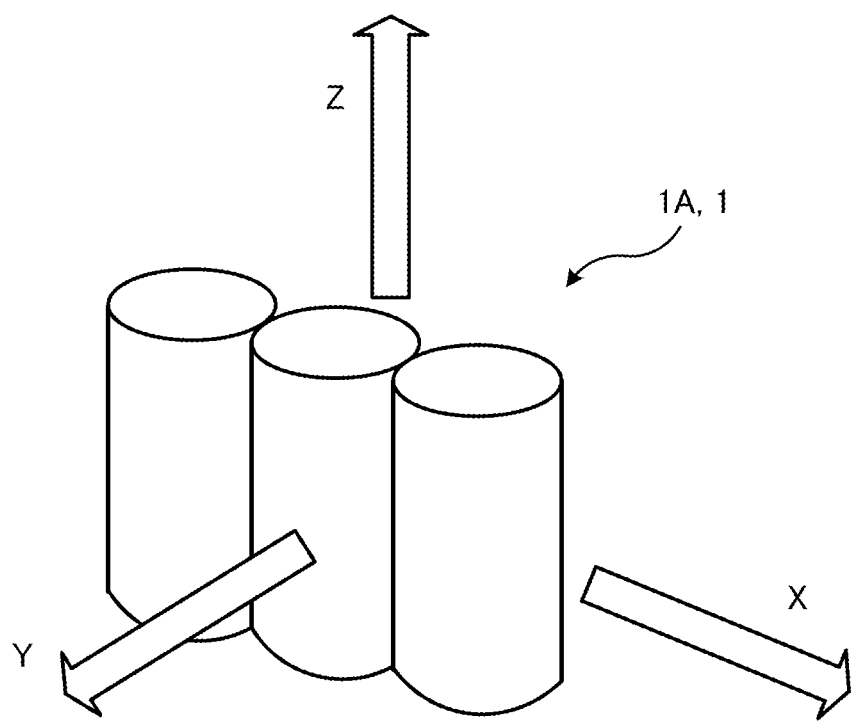
FIG. 10 illustrates an example of evaluation of the battery on which the connected body of the axial lead and the flat tab according to the embodiment is mounted.

FIG. 10 illustrates an example of evaluation of a battery on which a connected body of an axial lead and a flat tab according to the embodiment is mounted. FIG. 10 schematically illustrates a method for evaluating the impact of vibration of a battery.

Three batteries 1A, each of which was provided with a connected body of an axial lead 31 and an individual flat tab 60 obtained after resistance welding and before pressing of an end part 31a, were prepared. In addition, three batteries 1, each of which was provided with a connected body of an axial lead 31 and an individual flat tab 60 obtained after resistance welding and pressing of an end part 31a, were prepared. A lead wire 40 was disposed over the individual end part 31a of the axial lead 31. Next, the batteries 1A and 1 were vibrated under predetermined conditions in the X, Y, and Z directions as illustrated in FIG. 10. Next, occurrence of a voltage drop caused by a short circuit due to a rip of covering material of the lead wire 40 was evaluated. The batteries 1A and 1 were vibrated with 510 Hz in the X direction, 620 Hz in the Y direction, and 540 Hz in the Z direction (a resonance point in the individual direction, $10^7 \times 3$ directions).

Two of the three batteries 1A, each of which was provided with the connected body of the axial lead 31 and the flat tab 60 obtained after the resistance welding and before the pressing of the end part 31a, exhibited a voltage drop. In contrast, none of the three batteries 1, each of which was provided with the connected body of the axial lead 31 and the flat tab 60 obtained after the resistance welding and the pressing of the end part 31a, exhibited a voltage drop.

From these evaluation results, in the case of the individual battery 1A provided with the connected body of the axial lead 31 and the flat tab 60 obtained after the resistance welding and before the pressing of the end part 31a, if the lead wire 40 extends over the end part 31a of the axial lead 31, the covering material of the lead wire 40 is ripped relatively easily, and therefore, a short circuit due to the rip is also caused relatively easily. In contrast, in the case of the individual battery 1 provided with the connected body of the axial lead 31 and the flat tab 60 obtained after the resistance welding and the pressing of the end part 31a, even if the lead wire 40 extends over the end part 31a of the axial lead 31, it is possible to effectively prevent the covering material from being ripped and prevent a short circuit due to such a rip.

The above description assumes an example in which the battery 1 includes three cells 10 and is provided with the connected body of the axial lead 31 and the individual flat tab 60 obtained after the resistance welding and the pressing of the end part 31a. However, the number of cells 10 is not limited to this example. The connected body of the axial lead 31 and the flat tab 60 obtained after the resistance welding and the pressing of the end part 31a may be mounted on a battery including two cells 10 or four or more cells 10. While a group of cylindrical cells 10 constitutes the above battery, a group of rectangular cells may constitute the battery.

In addition, the above description assumes an example in which the axial lead 31 is connected to the flat tabs 60. However, the axial lead 31 may be connected to other elements. For example, the axial lead 31 may be connected to various kinds of metal plates such as the electrode tabs 20. By performing resistance welding between the midway part 31b of the axial lead 31 and such a different kind of metal plate as described above and deforming and flattening the end part 31a, which has been raised by the resistance welding, through pressing, it is possible to prevent a different component, such as the covering material of the flexible lead wire 40 that comes into contact with the end part 31a, from being damaged and prevent an electrical failure, such as a short circuit caused by the damaged different component, from occurring.

In addition, the above description assumes, as an example, a technique of performing resistance welding between the midway part 31b of the axial lead 31 of the electrical element 30 such as a diode, a current fuse, or a PTC element and a metal plate such as a flat tab 60 and deforming and flattening the end part 31a, which has been raised by the resistance welding, through pressing. The technique of performing the pressing after the resistance welding is applicable not only to connection between the axial lead 31 of the electrical element 30 and a metal plate such as a flat tab 60 but also to connection between various kinds of leads and metal plates. For example, the technique is also applicable to a case in which a lead used as an external connection terminal of a single cell or a battery is connected to a metal plate such as a tab connected to an electrode (a positive electrode or a negative electrode) of the single cell or the battery.

In one aspect, it is possible to achieve a cell that is provided with a lead welded to a metal plate, the lead being prevented from causing damage to a different component.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that various changes, substitutions, and alterations could be made hereto without departing from the spirit and scope of the disclosure.

What is claimed is:

1. A battery comprising:
   a first cylindrical electrochemical cell having a first electrode facing a first direction;
   a second cylindrical electrochemical cell having a second electrode facing the first direction and being adjacent to the first cylindrical electrochemical cell in a second direction perpendicular to the first direction;

a lead wire having a core wire covered by covering material and having one end connected to the first electrode;

a metal plate connected to the second electrode; and an electrical element provided adjacent to the second cylindrical electrochemical cell and having an axial lead that extends on a first principal surface of the metal plate, the first direction being perpendicular to the first principal surface, wherein the axial lead includes:

a main body part having a first diameter, and a connection part that is located from the main body part to an end part of the axial lead and that is connected to the first principal surface, wherein the connection part includes a first part which is located adjacent to the main body part, which includes a weld part welded to the first principal surface, and which has a first thickness less than the first diameter in the first direction perpendicular to the first principal surface, wherein the connection part includes a second part, which is located from the first part to the end part, which includes a non-weld part not welded to the first principal surface, and which has a second thickness equal to or less than the first thickness in the first direction, and wherein the lead wire extends from the one end connected to the first electrode toward the metal plate connected to the second electrode.

2. The battery according to claim 1, wherein the second thickness is 50% to 100% of the first thickness.

3. The battery according to claim 1, wherein the second part further includes the weld part continuously extending from the first part.

4. The battery according to claim 1, wherein the metal plate is electrically connected to a positive electrode or a negative electrode.

* * * * *